United States Patent [19]

Begley

[11] Patent Number: 4,979,634
[45] Date of Patent: Dec. 25, 1990

[54] HOLD-OPEN HINGE MECHANISM FOR A MOLDED PLASTIC COVER

[75] Inventor: Paul V. Begley, Earlysville, Va.

[73] Assignee: Cooper Industries, Inc., Houston, Tex.

[21] Appl. No.: 459,554

[22] Filed: Jan. 2, 1990

[51] Int. Cl.⁵ .............................................. H02G 3/14
[52] U.S. Cl. .................... 220/242; 220/3.8; 220/335; 220/337; 174/67; 16/267; 16/296
[58] Field of Search ................ 220/241, 242, 3.8, 335, 220/337; 174/66, 67; 16/254, 255, 267, 291, 292, 296, 341, 342

[56] References Cited

U.S. PATENT DOCUMENTS

| | | | |
|---|---|---|---|
| 1,455,399 | 5/1923 | Keavaney | 220/242 |
| 3,140,344 | 7/1964 | Slater et al. | 174/67 |
| 4,036,396 | 7/1977 | Kennedy et al. | |
| 4,097,958 | 7/1978 | Van Dell | |
| 4,157,853 | 6/1979 | Carey | 312/246 |
| 4,161,261 | 7/1979 | Frater | |
| 4,291,818 | 9/1981 | Nozawa et al. | |
| 4,343,397 | 9/1982 | Nozawa et al. | |
| 4,381,063 | 4/1983 | Leong | 220/242 |
| 4,505,403 | 3/1985 | Bowden, Jr. et al. | 220/242 |
| 4,693,392 | 9/1987 | Contreras | |
| 4,696,412 | 9/1987 | McGowan et al. | |

Primary Examiner—Stephen Marcus
Assistant Examiner—Stephen K. Cronin
Attorney, Agent, or Firm—Wigman & Cohen

[57] ABSTRACT

A hold-open hinge mechanism for a molded plastic rainproof cover for a circuit breaker is disclosed. The hinge mechanism comprises an integrally molded pivot pin on the cover member and a hinge member on the cover base which pivotally engages the pivot pin. When the cover member is opened to a given angle, projections on the cover member engage the surface upon which the cover is mounted to releasably retain the cover member in the open position.

17 Claims, 2 Drawing Sheets

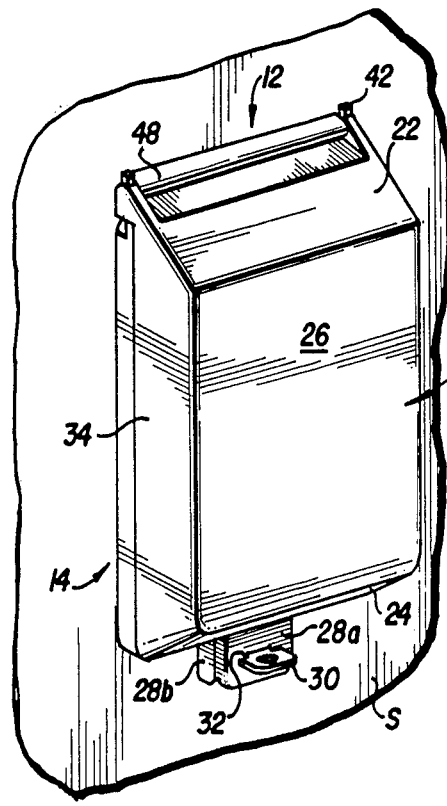
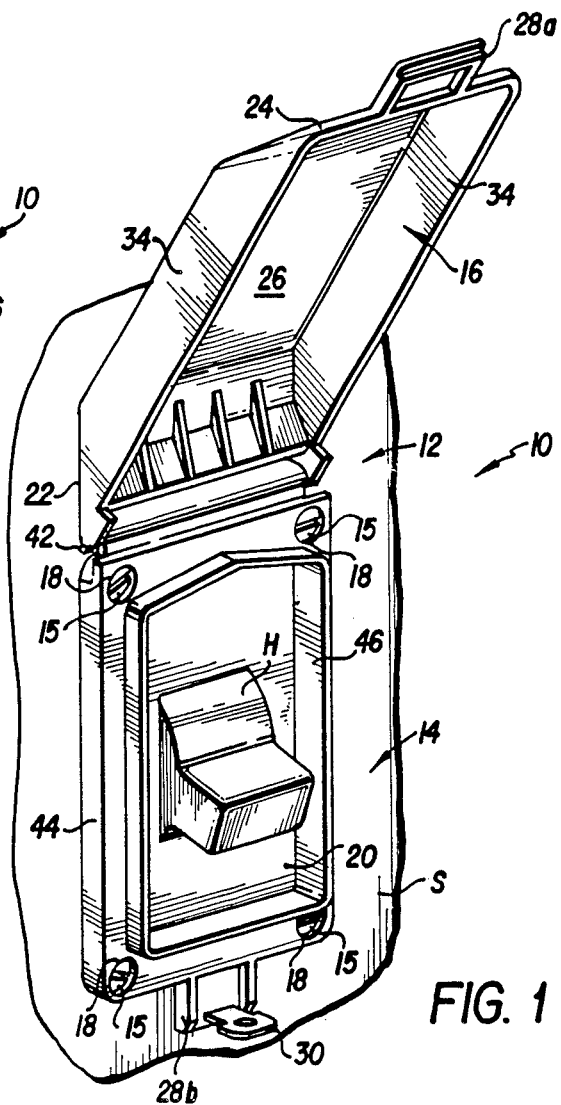
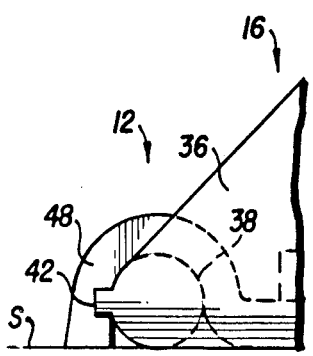
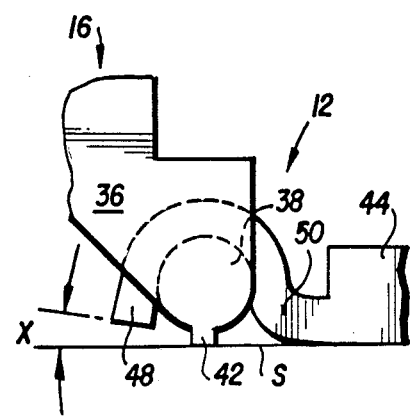
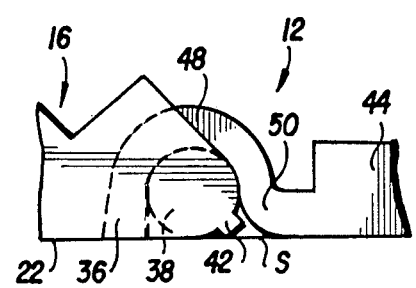
FIG. 2
FIG. 1
FIG. 6
FIG. 7
FIG. 8

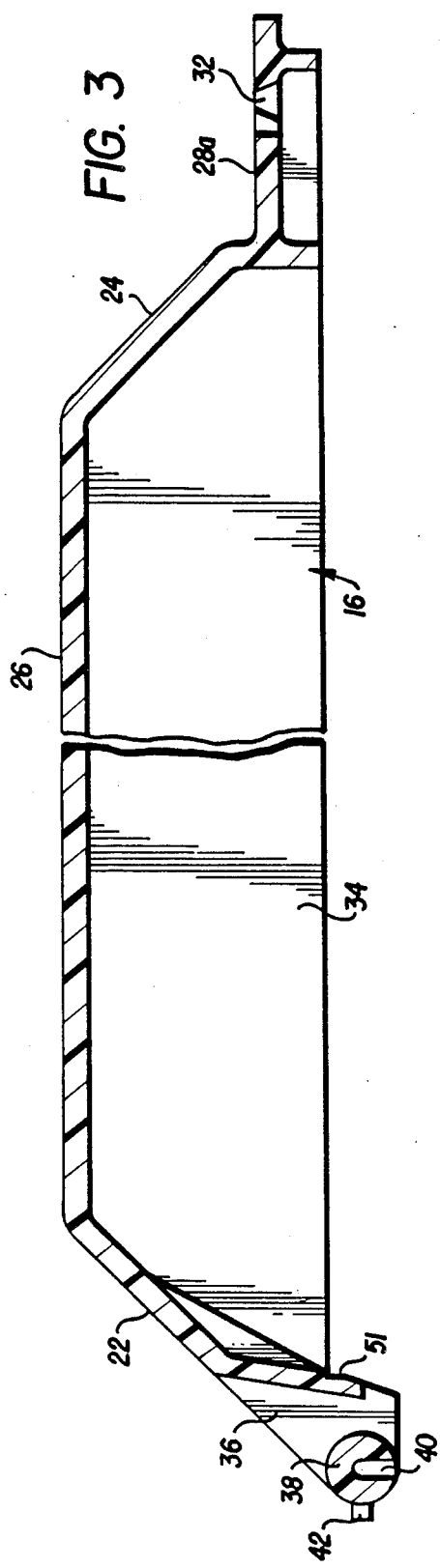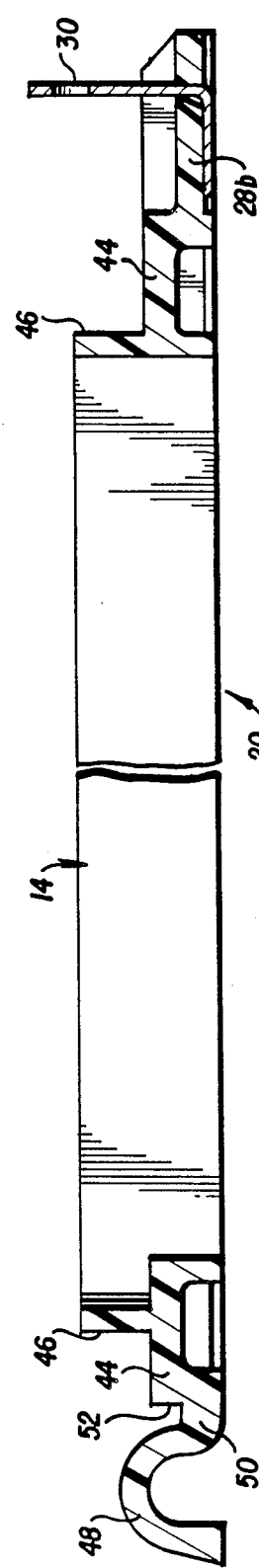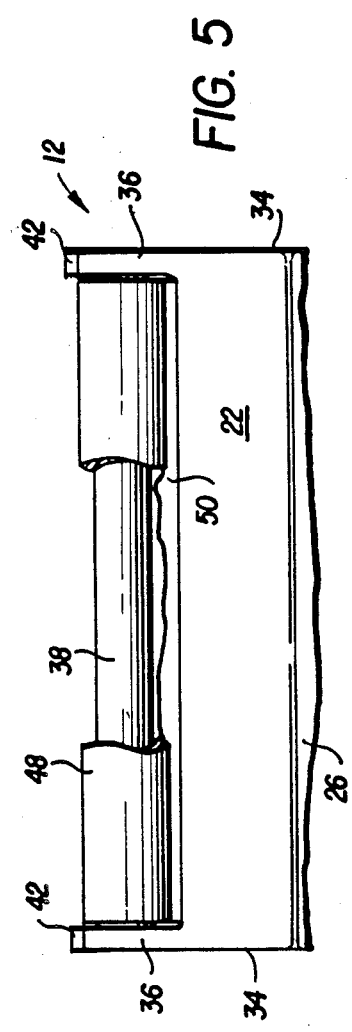

HOLD-OPEN HINGE MECHANISM FOR A MOLDED PLASTIC COVER

FIELD OF THE INVENTION

The present invention relates to hinge mechanisms for covers made of synthetic resin and more particularly to a hinge mechanism for a molded plastic cover having a hold-open position. The hinge mechanism of the invention is especially suitable for use in rainproof covers for circuit breakers in an enclosed panel board or circuit breaker enclosure, but may also be used for containers, boxes or the like when a hold-open feature is desired.

DESCRIPTION OF THE PRIOR ART

Hinge mechanisms for covers or lids having a hold-open feature are well known in the art. Examples of such known hinge mechanisms are disclosed in U.S. Pat. Nos. 4,291,818; 4,343,397; and 4,693,392 which are directed particularly to compacts for cosmetics or the like. Hinge mechanisms with a hold-open feature are also used in the automotive industry, for instance, to releasably retain the hood of an automobile in an open position as taught by U.S. Pat. No. 4,097,958, or to retain the cover member of an automotive ashtray in its closed or open position as taught by U.S. Pat. No. 4,157,853. U.S. Pat. No. 4,036,396 discloses a weatherproof cover assembly for an electrical junction box which includes a stay-open feature as well as a stay-closed or self-closing feature. U.S. Pat. Nos. 4,161,261 and 4,696,412 also disclose hinge construction for stay-open container lids.

In the aforementioned U.S. Pat. No. 4,157,853 the hinge for the ashtray cover is formed by a pair of pivotable hinge members each with a circular cross section and having a projection extending radially therefrom. The hinge members rotatably engage in U-shaped notches in a pair of spaced sidewalls. A leaf spring bears on the periphery of the hinge members and resiliently cooperates with the radial projections thereon to "snap" the ashtray cover into either the closed or the open position under the force of the leaf spring.

The hinge mechanism for the lid container disclosed in the aforesaid U.S. Pat. No. 4,161,261 includes hinge members with longitudinal openings through which hinge pins or rods extend as pivots about which the hinge members rotate. Projections are provided on the hinge members and are adapted to engage in complementary notches in the adjacent rim of the container to hold the lid of the container in a vertical open position.

SUMMARY OF THE INVENTION

It is a principal object of the present invention to provide a hinge construction for a container with a new and improved hold-open mechanism, especially for use in holding open a rainproof cover for a circuit breaker.

The present invention provides certain improvements in hold-open covers for containers, boxes or the like in which a hinge mechanism formed entirely of a synthetic resin or polymeric material hingedly mounts a cover member to a container, box or enclosure so that when the cover member is pivoted to its open position and released, it is held in that position until it is forcibly pivoted through a given arc toward its closed position. According to one feature of the present invention, the hinge components comprise a generally cylindrical pivot pin or member integrally molded with the cover member and a generally U-shaped hinge member integrally molded with or mounted to a cover base. The U-shaped hinge member rotatably engages about the pivot member. Projections are provided on side extremities of the cover member and extend generally radially with respect to the periphery of the pivot member. These projections, which are preferably integrally formed with the cover member, provide a cam or over-center toggle mechanism which causes the hinge mechanism to flex away from the mounting surface as the cover member is opened and then to flex back toward the mounting surface, such that the projections engage the mounting surface and hold the cover member in its open position.

In a preferred embodiment of the invention, the cover is used to enclose a circuit breaker of an electrical panel board in a rainproof manner. A cover base is mounted to the panel board over the circuit breaker and the cover member is hingedly mounted to the cover base so as to provide a rainproof enclosure for the circuit breaker. The cover member and pivot member are preferably integrally molded in one piece of a plastic material, such as a polycarbonate material. The cover base and hinge member are also preferably integrally molded in one piece of the same polycarbonate material.

The projections formed on the pivot member may be generally rectangular in shape or may be rounded, curved or contoured to strengthen the projection and provide a smoother transition between the projection and the surface of the cover member. Preferably, two integrally molded projections are provided, one on each side of the cover member adjacent the ends of the pivot member. As the cover member is rotated, the projections engage the surface to which the cover base is mounted (i.e., the surface of the panel board which houses the circuit breaker), flex the hinge member away from the mounting surface in a cam-like action, and then permit the hinge member to return to its rest or unflexed position and thereby retain the cover member in its open position.

From the foregoing summary, it will be observed that another object of the present invention is to provide a remarkably simple hold-open cover means without the use of complex spring arrangements and with a minimum of wear of the hinge mechanism.

A further object of the present invention is to provide simple and economical, yet effective, hold-open hinge mechanism for a hinged rainproof cover for a circuit breaker.

BRIEF DESCRIPTION OF THE DRAWINGS

The above and still further objects, features and attendant advantages of the present invention will become apparent to those skilled in the art from a consideration of the following detailed description of a presently preferred embodiment thereof taken in conjunction with the accompanying drawings in which:

FIG. 1 is a perspective view of the cover and hinge mechanism of the present invention shown in the hold-open position as a rainproof cover for a circuit breaker;

FIG. 2 is a perspective view of the cover of FIG. 1 shown in the closed position;

FIG. 3 is a broken cross-sectional view of the cover and hinge pivot member taken along the long axis of the cover;

FIG. 4 is a broken cross-sectional view of the cover base member taken along the long axis thereof;

FIG. 5 is a partial top view of the cover in the closed position illustrating the engagement of the pivot member of the cover and the hinge member of the base;

FIG. 6 is a fragmentary side elevation view showing the positions of the hinge and pivot members in the closed position of the cover;

FIG. 7 is a fragmentary side elevation view showing the positions of the hinge and pivot members in a position intermediate the closed and hold-open positions of the cover; and FIG. 8 is a fragmentary side elevation view showing the positions of the hinge and pivot members in the hold-open position of the cover.

DETAILED DESCRIPTION OF THE PREFERRED EMBODIMENT

Referring now to the drawings, there is illustrated in perspective in FIGS. 1 and 2 a cover means 10 in the form of a rainproof circuit breaker cover incorporating the novel hinge means 12 of the present invention. As shown particularly in FIG. 1, the cover means 10 is in the hold-open position and comprises a cover base 14 to which cover member 16 is hingedly connected by the hinge means 12. The cover means 10 is secured to a mounting surface S which, in the embodiment shown, is the front plate of a circuit breaker panel, by means of fasteners, shown as screws 15, passing through counterbored holes 18 in the four corners of the cover base 14.

The cover base 14 is provided with a central rectangular aperture 20 through which the operator handle H of a circuit breaker extends. The cover means 10, of course, may be used with other types of circuit breakers or with any other mechanism wherein a cover with a hold-open feature is desirable. In the embodiment disclosed, the cover member 16 has a generally trapezoidal longitudinal cross-section with inclined end walls 22,24 each arranged at about a 45° angle to the plane of the top wall 26 of the cover member. See FIG. 3. As shown in FIG. 1, the hold-open position of the cover member 16 is at about a 45° angle so that the end wall 22 is disposed approximately parallel to the plane of the mounting surface S. Although the 45° hold-open angle is preferred, other angles are contemplated within the scope of the invention.

Referring now to FIG. 2, at the lower end of the cover means 10 a latching means 28a, 28b is provided comprising an upstanding latching tongue 30 on the cover base 14 which engages in an aperture 32 on the cover member 16. The latching means 28a,28b may be further provided with conventional security locking means, such as a padlock, or conventional anti-tampering means, such as a lead-sealed security wire (not shown).

The cover member 16 is shown in longitudinal cross-section in FIG. 3 and is molded in one-piece of a plastic material, such as polycarbonate. As previously mentioned, cover member 16 has a generally trapezoidal shape in longitudinal cross-section with the end walls 22,24 at about a 45° angle. The cover member 16 has a pair of side walls 34 (only one shown in FIG. 3) which are integrally molded with end walls 22,24 and the top wall 26. Referring to FIGS. 3 and 5, side walls 34 have integral depending extensions 36 which project beyond the trapezoidal cavity of the cover member. A cylindrical pivot member 38 extends between and is integrally formed with the extensions 36. The axis of the pivot member is located below the lower edges of the side walls 34 as shown in FIG. 3. To avoid distortion of the cylindrical surface of the pivot member 38 during molding, one or more radial cavities 40 are formed in the pivot member by means of mold inserts so as to maintain a substantially uniform thickness of mold sections in the pivot member.

Each extension 36 is provided with a projection 42 adjacent each end of the pivot member and projecting radially away from the axis of the pivot member in a plane substantially parallel to the bottom edges of the side walls 34. In the embodiment described, the projections are arranged on the extensions 36 at an angle of about 135° with respect to the plane of end wall 22, although other angular arrangements are possible. As shown in FIG. 3, the projections 42 are generally rectangular in shape, however, if desired, they may also be rounded to provide a smoother transition with the surfaces of the extensions 36.

The cover member 16 has a molded sealing surface 51 on the inside of the upper wall of the cover near the pivot member 38. This sealing surface is pressed against a sealing surface 52 on the base member 14 when the cover is closed to prevent water from entering the top of the cover means.

The cover base 14 shown in cross-section in FIG. 4 is also molded in one-piece of a plastic material, such as polycarbonate, and comprises a generally rectangular base member 44 with a generally rectangular central aperture 20 (see FIG. 1). An upstanding peripheral rim 46 is provided about the aperture 20 and projects into the trapezoidal cavity in the cover base 14 when the cover member 16 is in the closed position shown in FIG. 2. This arrangement provides added protection from rain water, imparts stiffness to the base, and discourages tampering with the circuit breaker by preventing the insertion of a foreign object, tool, wire or the like into the interior of the cover member.

A hinge member 48 having a generally U-shaped cross section is formed at one end of the rectangular base 44 and is integrally connected to the base by a neck means 50 of plastic material. As shown in FIG. 5, the cover base 14 and cover member 16 are assembled together with the hinge member 48 engaging over the pivot member 38 such that the base 14 and cover 16 are pivotably connected together. The hinge member 48 has a length less than the distance between the extensions 36 so as to leave a small space between each extension 36 and the end of the hinge member confronting the extension.

Referring now to FIGS. 6-8, the operation of the cover hold-open mechanism will be described. FIG. 6 shows the cover member 16 in the closed position of FIG. 2 with the projections 42 (only one shown) extending parallel to the mounting surface S. To open the cover, the latching means 28a,28b is released and the cover member 14 is pivoted upwardly or counterclockwise as viewed in FIGS. 6–8 about the axis of pivot member 38. As the cover member 16 is pivoted, the projections 42 rotate toward and engage the mounting surface S. Continued pivoting of the cover member 16 causes the projections 42 to cam against the mounting surface and urge the pivot member 38 upwardly against the hinge member 48. The upward camming force on the pivot member is resisted by the hinge member but continued application of the counterclockwise opening force causes the hinge member to flex in the neck region 50 of the base 44. The hinge member thus rotates upwardly or clockwise through a small angle X about an axis located in the proximity of the neck means 50 of the base as shown in FIG. 7. In the position shown in FIG. 7, the cover member 16 extends at about a right angle to the mounting surface S and the angle of flexure X of the hinge member is at or near maximum.

A further slight counterclockwise pivoting of the cover member 16 permits the energy stored in the flexed hinge member 48 to assist in forcing the cover member 16 to its full hold-open position shown in FIG. 8. In that position, the cover member 16 is disposed at about a 45° angle to the mounting surface, i.e., a 135° opening angle, such that the inclined end wall 22 and the edge surfaces of the extensions 36 coplanar with wall 22 are substantially parallel to the mounting surface S. The hinge member 48 has returned to its original position with the neck means 50 substantially unflexed. The projections 42 bear on the mounting surface S and function as detents or stops to retain the cover member 16 in its hold-open position until a clockwise force is applied to the cover member to reverse the sequence of operation shown in FIGS. 6–8.

From the foregoing it will be appreciated by those skilled in the art that the present invention provides a simple, yet effective, hold-open mechanism for a molded plastic cover. While the hold-open mechanism of the invention is disclosed in connection with an embodiment of a rainproof cover for a circuit breaker, it will also be appreciated by those skilled in the art that other types of covers may advantageously employ the hold-open mechanism of the present invention. Although the cover means of the invention is disclosed as being molded of polycarbonate, other suitable plastic materials may be used.

With the foregoing and other objects, advantages and features of the invention that will become hereinafter apparent, the nature of the invention may be more clearly understood by reference to the following detailed description of the invention, the appended claims and to the several views illustrated in the attached drawings.

Although only preferred embodiments are specifically illustrated and described herein, it will be appreciated that many modifications and variations of the present invention are possible in light of the above teachings and within the purview of the appended claims without departing from the spirit and intended scope of the invention.

WHAT I CLAIM IS:

1. A cover comprising:
   a cover base adapted to be mounted to a mounting surface;
   a cover member having a closed position and a hold-open position;
   hinge means connecting the cover member to the cover base for pivoting the cover member relative to the cover base, said hinge means comprising a pivot member on the cover member and a hinge member on the cover base; and
   at least one projection means on the cover member and engagable with the mounting surface for releasably retaining the cover member in its hold-open position.

2. The cover according to claim 1, including neck means resiliently connecting the hinge member to the cover base for permitting flexure of the hinge member away from the mounting surface.

3. The cover according to claim 1, wherein said cover member includes a pair of extensions, said pivot member extending between said extensions, said hinge member having a U-shaped cross-section adapted to rotatably engage over said pivot member, said at least one projection means being formed on one of said extensions.

4. The cover according to claim 3, wherein said pivot member has a cylindrical shape and a projection means on each of said extensions.

5. The cover according to claim 1, wherein said cover member, pivot member and projection means are integrally molded in one piece of plastic material.

6. The cover according to claim 5, wherein said cover base and hinge member are integrally molded in one piece of a plastic material.

7. The cover according to claim 1, including means for fastening said cover base to the mounting surface.

8. The cover according to claim 1, wherein said cover member comprises a top wall and end walls, each end wall being inclined at an angle to the top wall so as to form a cavity with a trapezoidal cross-section, said cover base having an upstanding rim extending into said cavity adjacent an interface between the cover member and the cover base.

9. The cover according to claim 1, wherein the pivot member has opposite ends connected to the cover member, said projection means extending from the cover member adjacent each end of the pivot member and in a plane through the longitudinal axis of the pivot member.

10. A rainproof hold-open cover for a circuit breaker adapted to be mounted in an electrical panel comprising a cover base, means for fastening the cover base to the electrical panel, a U-shaped hinge member connected to said cover base by a resilient neck member, a cover member having a cylindrical pivot member, said U-shaped hinge member rotatably engaging over said pivot member, at least one projection means on said cover member adjacent an end of the pivot member for releasably retaining the cover member in the open position, said projection means being engagable with the surface of the electrical panel when said cover member is rotated to an open position.

11. The cover of claim 10, wherein said cover base, hinge member and neck member are integrally molded in one piece of a plastic material and said cover member, pivot member and projection means are integrally molded in one piece of a plastic material.

12. The cover of claim 10, wherein said cover member and said cover base have an interface therebetween when in the closed position, said interface including means for discouraging tampering with the circuit breaker.

13. The cover of claim 12, wherein said interface comprises an upstanding peripheral rim on the cover base for protecting the circuit breaker from rain water and for stiffening the cover base.

14. The cover of claim 10 wherein said cover member comprises a top wall, end walls and side walls defining a trapezoidal cavity, a pair of extensions depending from the cover member, each extension being coplanar with a respective side wall, said pivot member being connected between said extensions.

15. The cover of claim 10, including latching means on said cover member and cover base for releasably locking the same in the closed position.

16. The cover of claim 14, wherein said hinge member engages over substantially the entire length of the pivot member between said extensions.

17. The cover of claim 10, wherein said cover member includes a surface which interfaces with a surface on said cover base when said cover is in the closed position to form a rainproof seal therebetween.

* * * * *